United States Patent
Rebreyend et al.

(10) Patent No.: US 7,121,120 B2
(45) Date of Patent: Oct. 17, 2006

(54) METHOD OF GLAZING AN OPTICAL FIBER PREFORM WITH A PLASMA OF REDUCED POWER

(75) Inventors: Pierre Rebreyend, Lille (FR); Daniel Dericquebourg, Roelloecourt (FR); David Facompre, Lille (FR)

(73) Assignee: Alcatel, Paris (FR)

( * ) Notice: Subject to any disclaimer, the term of this patent is extended or adjusted under 35 U.S.C. 154(b) by 436 days.

(21) Appl. No.: 10/428,930

(22) Filed: May 5, 2003

(65) Prior Publication Data

US 2003/0182971 A1    Oct. 2, 2003

Related U.S. Application Data

(63) Continuation of application No. 09/605,882, filed on Jun. 29, 2000.

(30) Foreign Application Priority Data

Jul. 1, 1999    (FR) .................................. 99 08457

(51) Int. Cl.
*C03B 37/12* (2006.01)
(52) U.S. Cl. .............................. 65/391; 65/404; 65/104
(58) Field of Classification Search .................. 65/391, 65/404, 104
See application file for complete search history.

(56) References Cited

U.S. PATENT DOCUMENTS

| | | | |
|---|---|---|---|
| 4,221,825 A | 9/1980 | Guerder et al. | |
| 4,402,720 A | 9/1983 | Edahiro et al. | |
| 4,440,558 A * | 4/1984 | Nath et al. | 65/391 |
| 4,642,129 A | 2/1987 | Douklias et al. | |
| 4,689,212 A * | 8/1987 | Mansfield | 427/452 |
| 4,863,501 A * | 9/1989 | Mansfield | 65/391 |
| 5,130,537 A * | 7/1992 | Okamoto et al. | 250/281 |
| 5,194,714 A | 3/1993 | Le Sergent | |
| 5,279,633 A | 1/1994 | Fleming | |
| 5,653,895 A * | 8/1997 | Shintani | 219/121.5 |
| 5,922,098 A * | 7/1999 | Tsuneishi et al. | 65/384 |
| 5,970,750 A | 10/1999 | Humbert et al. | |
| 6,004,631 A * | 12/1999 | Mori | 427/534 |
| 6,202,447 B1 | 3/2001 | Drouart et al. | |
| 6,269,663 B1 | 8/2001 | Drouart et al. | |

FOREIGN PATENT DOCUMENTS

| | | |
|---|---|---|
| EP | 0727392 A1 | 6/1996 |
| EP | 0887318 A1 | 12/1998 |
| JP | 59-6259 | 2/1984 |
| JP | 60-251241 | 8/1985 |
| JP | 61-21930 | 1/1986 |

OTHER PUBLICATIONS

Merriam Webster's Collegiate Dictionary, Tenth Edition, p. 582, 1997.*

* cited by examiner

*Primary Examiner*—John Hoffmann
(74) *Attorney, Agent, or Firm*—Sughrue Mion, PLLC

(57) ABSTRACT

A method of fabricating an optical fiber preform includes an operation of glazing the outside surface of the preform using inductive heating, of the plasma torch type, for localized heating of the preform. A flow of gas between the plasma and the preform in the area of the outside face of the preform on which the plasma impinges reduces the power of the plasma in this outside surface area.

10 Claims, 1 Drawing Sheet

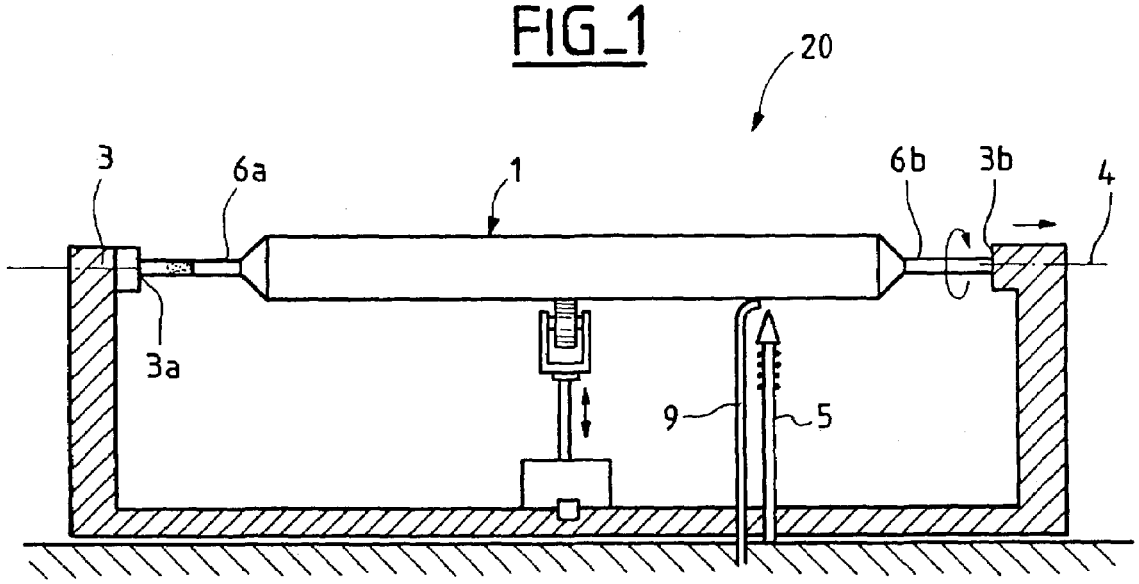
FIG_1
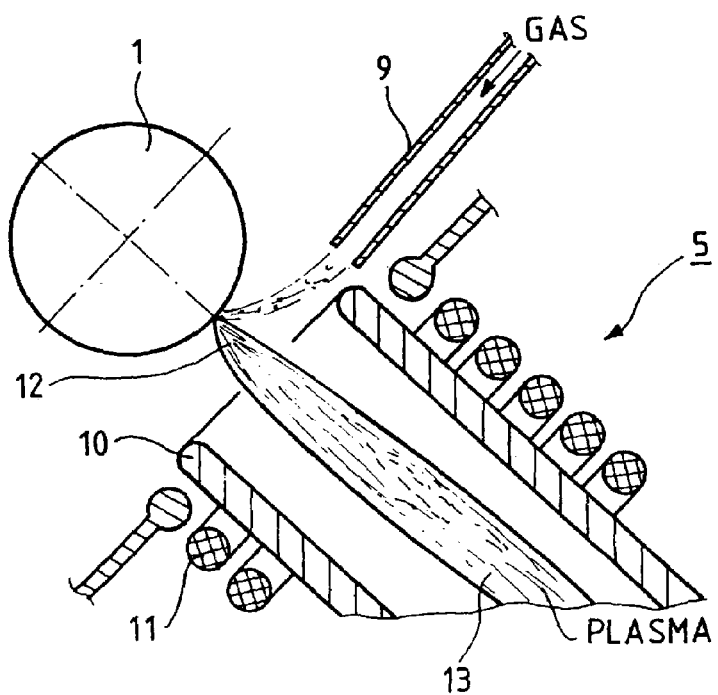
FIG_2

METHOD OF GLAZING AN OPTICAL FIBER PREFORM WITH A PLASMA OF REDUCED POWER

This is a continuation of application Ser. No. 09/605,882 filed Jun. 29, 2000; the disclosure of which is incorporated herein by reference.

BACKGROUND OF THE INVENTION

1. Field of the Invention

The invention concerns a plasma torch and a method of fabricating a glass preform to be used in the production of an optical fiber, and in particular a method of glazing the external surface of the preform. It also concerns a preform fabrication system using that method.

2. Description of the Prior Art

As is known in the art, a preform to be used in the production of an optical fiber by a drawing operation is conventionally fabricated or surfaced by depositing silica in successive concentric layers onto a primary preform and by glazing the surface of the outside layer of the resulting cylindrical member.

A preform fabrication method known in the art starts from a cylindrical primary preform onto which silica is deposited in concentric layers by heating the preform locally, using inductive heating means of the plasma torch type, and depositing molten silica obtained from grains of silica injected into the plasma at the mouth of the torch. The molten silica is incorporated into the heated silica at a high temperature in the area of the outside surface of the preform on which the plasma impinges.

Some of the silica melted in this way evaporates because of the high temperatures reached in the plasma and tends to be deposited in the form of soot on cooling. These deposits of soot can be a particular problem because they affect in particular outside areas of the preform which are cooler than the target area. Such deposits are also produced in abundance when one of the two ends of the preform must be heated locally so that it can be cut and the preform obtained in this way worked at one end to have a conical pointed shape which must be of the same optical quality as the rest of the preform for subsequent production of a fiber by hot drawing.

It is known in the art to glaze the outside surface of a preform by heating the preform by means of a plasma torch under conditions corresponding to those for depositing a layer of silica, but without feeding any silica. This improves the surface state of the preform because the plasma vitrifies some of the soot present on the preform. The action of the plasma evaporates a non-negligible quantity of silica because of the intense heating of the target area of the outside surface of the preform. As is known in the art, technological constraints rule out reducing the power of the plasma, which would otherwise be desirable to prevent evaporation of silica during glazing. Soot is therefore created and deposited onto the parts of the preform which are sufficiently cool, and in particular onto the portion of the outside surface of the preform where the glazing operation has just been carried out. Soot remaining on the outside surface of a preform constitutes a serious problem in terms of quality and compromises subsequent drawing operations performed to obtain a fiber.

Attempts have therefore been made to reduce the production of soot by increasing the speed of movement in translation of the preform relative to the plasma torch. The drawback of this solution is that it increases the internal stresses which inevitably occur when the preform is heated by a plasma because of its instantaneous localization to a limited area of the preform and the sudden variations in temperature which then occur between the strongly heated area and the adjoining areas of the preform. It is known in the art to eliminate the internal stresses produced in a preform by annealing in a furnace, but this takes significantly longer than a glazing operation; it conventionally takes about 15 hours.

Document EP-0 887 318 mentions that, to avoid the problems associated with the formation of soot during the operation of drawing a large-diameter preform into a smaller diameter intermediate preform using an oxygen-hydrogen torch, the soot is expelled by a flow of gas with a high flowrate, of the order of 150 l/min.

The object of the present invention is therefore to provide a plasma torch which in particular prevents the deposition of soot during the glazing of an optical fiber preform.

SUMMARY OF THE INVENTION

To this end the invention proposes a plasma torch for locally heating a target and which includes means for injecting a gas between the plasma and the target in the area of the target to be heated so as to reduce the power of the plasma in that area.

The gas injected in this way indirectly reduces the power of the plasma torch because it creates a kind of gas screen between the torch and the target which absorbs some of the power generated by the plasma.

Although it is technologically difficult to reduce the power of a plasma torch (which is generally of the order of 38 kW to 50 kW), the invention reduces the power indirectly, by operating on the plasma itself and not on the means of producing it.

Another object of the present invention is to provide a method of fabricating an optical fiber preform in which the deposition of soot during glazing is limited compared to the methods known in the art.

To this end the invention proposes a method of fabricating an optical fiber preform including an operation of glazing the outside surface of the preform using inductive heating means of the plasma torch type for localized heating of the preform and wherein a flow of gas between the plasma and the preform in the area of the outside surface of the preform on which the plasma impinges reduces the power of the plasma in the area.

Thanks to the invention, because the power of the plasma is reduced in the area of the outside surface on which the plasma impinges, no unwanted soot is produced and the power of the plasma is just sufficient to carry out the glazing operation without harmful secondary effects.

In one particular embodiment the flowrate of the gas is from 3 l/min to 6 l/min and preferably equal to 4 l/min. This flowrate reduces the power of the plasma without moving it, which could lead to the formation of an electric arc.

According to one feature of the invention the gas is air or a neutral gas.

The invention also proposes a system for fabricating an optical fiber preform, the system including:
- means for holding the preform at both ends,
- inductive heating means of the plasma torch type for localized heating of the preform,
- means for rotating the preform about its longitudinal axis,
- means for moving the preform relative to the plasma torch in the direction parallel to the axis, and means for injecting a gas between the preform and the plasma produced by the torch in the area of the outside surface of the preform on which the plasma impinges.

According to one advantageous feature of the invention the gas injector means include an injector nozzle fixed relative to the torch, in the vicinity of which it is positioned so as to form, conduct and orient a jet of gas at d particular flowrate onto the area of the outside surface of the preform on which the plasma impinges.

Other features and advantages of the present invention will become apparent in the course of the following description of one embodiment of the invention, which description is given by way of illustrative and non-limiting example only and with reference to the accompanying drawing.

BRIEF DESCRIPTION OF THE DRAWING

FIG. 1 is a simplified diagram of a system in accordance with the invention for producing an optical fiber preform using the method according to the invention.

FIG. 2 is a schematic diagram of a plasma torch according to the invention used in the system shown in FIG. 1.

DETAILED DESCRIPTION OF THE PREFERRED EMBODIMENT

The system 20 according to the invention shown in FIG. 1 is used to fabricate a glass preform 1, to be used in particular to produce an optical fiber by hot drawing. In a manner known in the art, a preform 1 of this kind is usually obtained by depositing successive concentric layers of silica onto a cylindrical primary preform (not shown) which has a longitudinal axis 4.

The system 20 includes means 3, for example a glass-maker's lathe, for rotating the preform 1 about its axis, with the preform held horizontally at its ends between two mounting points 3a, 3 by means of respective end-pieces 6a, 6b at the two ends of the preform.

The system 20 also includes inductive heating means which preferably consist of a plasma torch 5. The torch is accurately positioned in the radial direction relative to the axis 4 of the preform 1 when the latter is held between the mounting points 3a, 3b. Positioning is effected under conditions chosen so that the end of the flame 12 (see FIG. 2) formed by the plasma 13 impinges on the outside surface of the preform 1. This is known to the skilled person. The preform is heated internally behind the area of its outside surface on which the plasma impinges.

The plasma torch is associated with material feeding means, not shown, which are conventionally used to inject grains of silica into the plasma at the torch outlet, where the grains are melted. A localized deposit of silica is therefore obtained on the area of the outside surface of the preform on which the plasma impinges. Relative movements in translation of the preform and the torch deposit silica onto an area of limited width along the length of the preform. Continuous rotation of the preform 1 about the axis 4 deposits a layer of silica forming a regular covering on the outside surface of the preform. The final preform is obtained by repeating operations which lead to the thickening of the preform by successively depositing concentric layers.

It is feasible for the torch to be moved in translation relative to the preform. In a preferred arrangement known in the art the primary preform is mounted on a lathe, as already indicated above, and the lathe moves the preform in translation during fabrication, with the preform turning and held at its ends and the torch 5 held fixed, at least during heating, as are the material feeding means.

According to the invention, a flow of gas such as a flow of air or a flow of neutral gas such as helium or argon is maintained between the plasma 13 and the preform 1 in the area of the outside surface of the preform on which the plasma impinges during glazing of the preform. The flow of gas is fed via injection nozzle 9 which discharges into the area mentioned above. The nozzle 9 is mechanically fixed relative to the mouth of the conduit 10 through which the plasma is ejected from the torch 5, at a distance determined so that the gas ejected by the nozzle is between the preform on which the end of the plasma impinges and the flame 12 of the latter when the torch is in operation.

In a manner that is known in the art, the area of the outside surface of the preform which is targeted at a given time is heated by the plasma centered by means of a coil 11 around the ejection conduit 10 of the torch 5. This heat received at the surface diffuses into the preform.

The gas between the plasma 13 and the surface of the target area reduces the quantity of heat transmitted by the plasma at the surface of the preform, which is equivalent to reducing the power of the plasma, which cannot otherwise be achieved if the some torch 5 is used to apply heat in the various phases of fabrication of the preform (deposition, glazing and separation of the end-pieces in particular).

The ejector nozzle 9 is positioned to obtain a jet of gas whose shape and direction are determined for maximum efficiency.

In a preferred embodiment of the invention the gas flowrate is from 3 l/min to 6 l/min, for example of the order of 4 l/min. A flowrate of this magnitude reduces the power of the plasma without moving it, which could lead to the formation of an electric arc.

This injection of gas onto the outside surface area of the preform on which the plasma impinges at any given time enables a speed of rotation and a speed of movement in translation of the preform to be chosen that are best suited to obtaining the required results, more particularly absence of internal stresses in the preform. In this way it is possible to maintain low speeds of movement of the preform since the quantity of heat transmitted by the plasma to the target area is reduced by the injected gas and the internal stresses that might otherwise be caused by localized heating can be prevented. It is then no longer necessary to have a final phase of eliminating internal stresses by placing the fabricated preform in an annealing furnace for a long period of time.

Thus in the glazing phase the rotation speed can be from 35 rpm to 50 rpm and is preferably around 40 rpm and the speed of movement in translation can be from 25 mm/min to 35 mm/min and is preferably around 34 mm/min.

What is claimed is:

1. A method of fabricating an optical fiber preform including an operation of glazing the outside surface of said preform using a plasma torch for localized heating of the perform during a time when the plasma is substantially free of injected silica particles, wherein said plasma torch includes means for injecting a gas which is substantially free of silica particles between the plasma torch and said preform in the area of said preform to be heated so as to reduce the power of said plasma in said area, said method including the step of injecting said gas between the plasma torch and said preform during said glazing operation in the area of an outside surface of said preform on which said plasma impinges during said glazing operation, to thereby reduce the power of said plasma in said area during said glazing operation.

2. The method claimed in claim 1 wherein the flowrate of said gas is from 3 l/min to 6 l/min.

3. The method claimed in claim 1 wherein said gas is air.

4. The method claimed in claim 1 wherein said gas is a neutral gas.

5. The method claimed in claim 1 wherein the flowrate of said gas is 4 l/min.

6. A method of fabricating an optical fiber preform including an operation of glazing the outside surface of said preform using a plasma torch for localized heating of the perform during a time when the plasma is substantially free of injected silica particles, said method including the step of injecting a gas which is substantially free of silica particles between the plasma torch and said preform during said glazing operation in the area of an outside surface of said preform on which said plasma impinges during said glazing operation, to thereby reduce the power of said plasma in said area during said glazing operation.

7. The method claimed in claim 6 wherein the flowrate of said gas is from 3 l/min to 6 l/min.

8. The method claimed in claim 6 wherein said gas is air.

9. The method claimed in claim 6 wherein said gas is a neutral gas.

10. The method claimed in claim 6 wherein the flowrate of said gas is 4 l/min

* * * * *